United States Patent
Strandborg et al.

(10) Patent No.: US 12,462,408 B2
(45) Date of Patent: Nov. 4, 2025

(54) REDUCING TEXTURE LOOKUPS IN EXTENDED-REALITY APPLICATIONS

(71) Applicant: Varjo Technologies Oy, Helsinki (FI)

(72) Inventors: Mikko Strandborg, Helsinki (FI); Antti Hirvonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 289 days.

(21) Appl. No.: 18/449,352

(22) Filed: Aug. 14, 2023

(65) Prior Publication Data
US 2025/0061593 A1    Feb. 20, 2025

(51) Int. Cl.
*G06T 7/50*    (2017.01)
*G06T 7/11*    (2017.01)

(52) U.S. Cl.
CPC ............ *G06T 7/50* (2017.01); *G06T 7/11* (2017.01); *G06T 2207/10028* (2013.01)

(58) Field of Classification Search
CPC ... G06T 7/50; G06T 7/11; G06T 2207/10028; G06F 3/011; H04N 13/128; H04N 13/344
See application file for complete search history.

(56) References Cited

U.S. PATENT DOCUMENTS

| | | | |
|---|---|---|---|
| 9,542,010 B2 * | 1/2017 | Roberts | G06F 3/04815 |
| 11,652,976 B1 * | 5/2023 | Ollila | H04N 23/676 |
| | | | 348/51 |
| 11,966,045 B2 * | 4/2024 | Ollila | G06F 3/013 |
| 2018/0160048 A1 * | 6/2018 | Rainisto | G06F 3/013 |

(Continued)

FOREIGN PATENT DOCUMENTS

| | | | | |
|---|---|---|---|---|
| WO | WO-2016099556 A1 * | 6/2016 | | G06F 3/013 |
| WO | WO-2024233094 A1 * | 11/2024 | | G06T 7/521 |

OTHER PUBLICATIONS

Kundu, J. et al. "VRT-Net: Real-Time Scene Parsing via Variable Resolution Transform" Proceedings of the IEEE/CVF Winter Conference on Applications of Computer Vision (WACV), 2020, pp. 2049-2056 (Year: 2020).*

*Primary Examiner* — Mia M Thomas
(74) *Attorney, Agent, or Firm* — ZIEGLER IP LAW GROUP, LLC.

(57) ABSTRACT

A display apparatus has a display area of an output image divided into a plurality of regions. For a given region of the output image, a corresponding first region in a video-see-through (VST) image and a corresponding second region in at least one virtual-reality (VR) image are determined. From a depth map corresponding to the VST image, a minimum optical depth and a maximum optical depth in the first region of the VST image are determined. From a depth map corresponding to the at least one VR image, a minimum optical depth and a maximum optical depth in the second region of the at least one VR image are determined. When the minimum optical depth in the first region of the VST image is greater than the maximum optical depth in the second region of the at least one VR image, pixel data for pixels in the given region of the output image from the second region of the at least one VR image is fetched. Otherwise, when the minimum optical depth in the second region of the at least one VR image is greater than the maximum optical depth in the first region of the VST image, the pixel data for the pixels in the given region of the output image from the first region of the VST image is fetched.

15 Claims, 3 Drawing Sheets

(56) References Cited

U.S. PATENT DOCUMENTS

| | | | | |
|---|---|---|---|---|
| 2018/0335925 | A1* | 11/2018 | Hsiao | G06F 3/017 |
| 2021/0096368 | A1* | 4/2021 | Carlsson | G02B 27/0172 |
| 2022/0327784 | A1* | 10/2022 | Strandborg | G06T 17/00 |
| 2023/0419595 | A1* | 12/2023 | Xiong | H04N 13/243 |
| 2024/0319377 | A1* | 9/2024 | Feyerabend | G01S 17/894 |
| 2025/0076969 | A1* | 3/2025 | Xiong | G06F 3/013 |
| 2025/0148701 | A1* | 5/2025 | Xiong | G06T 7/11 |
| 2025/0157123 | A1* | 5/2025 | Räntilä | G06T 15/00 |

* cited by examiner

REDUCING TEXTURE LOOKUPS IN EXTENDED-REALITY APPLICATIONS

TECHNICAL FIELD

The present disclosure relates to methods implemented by display apparatuses for reducing texture lookups in extended-reality applications, and such display apparatuses. The present disclosure relates to methods implemented by servers for reducing texture lookups in extended-reality applications, and systems comprising such servers.

BACKGROUND

In extended-reality application, a display apparatus typically employs depth maps to perform depth comparisons when mixing virtual-reality (VR) content with video-see-through (VST) content. Conventionally, a depth map corresponding to the VR content is compared pixel-by-pixel against a depth map corresponding to the VST content, and any of the VR content or the VST content that is closer from a given pose of a user is displayed to the user.

In some cases where the VR content or the VST content fills an entirety of a display area of an output image and depth comparison is programmatically disabled, while three degrees-of-freedom (3DOF) reprojection is used, a compositor only has to perform one texture sampling operation per displayed pixel from the colour data. However, in other cases where the VR content is intermixed with the VST content across the display area, the compositor has to perform the following operations on per-pixel basis:
(i) fetch an optical depth of the VR content
(ii) fetch an optical depth of the VST content
(iii) compare the optical depth of the VR content with the optical depth of the VST content to determine which one of the VR content and the VST content occludes another of the VR content and the VST content (iv) fetch colour values from either VR colour data or VST colour data for the output image depending on the comparison.

Therefore, such cases involve thrice a texture-memory-read bandwidth as compared to a full VR case or a full VST case. This has a tremendous performance impact, especially when the display apparatuses are wireless. Furthermore, in many cases, there may be several VR images, for example, rendered by different VR applications, whose respective VR content may need to be presented on the display area simultaneously; in such cases, this problem gets multiplied.

Therefore, in light of the foregoing discussion, there exists a need to overcome the aforementioned drawbacks.

SUMMARY

The aim of the present disclosure is to provide a system and a method that are capable of performing depth texture lookups and comparisons for virtual-reality content and video-see-through content in computationally-efficient and time-efficient manner. The aim of the present disclosure is achieved by a method implemented by a display apparatus, a method implemented by at least one server, the display apparatus and a system comprising the at least one server, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
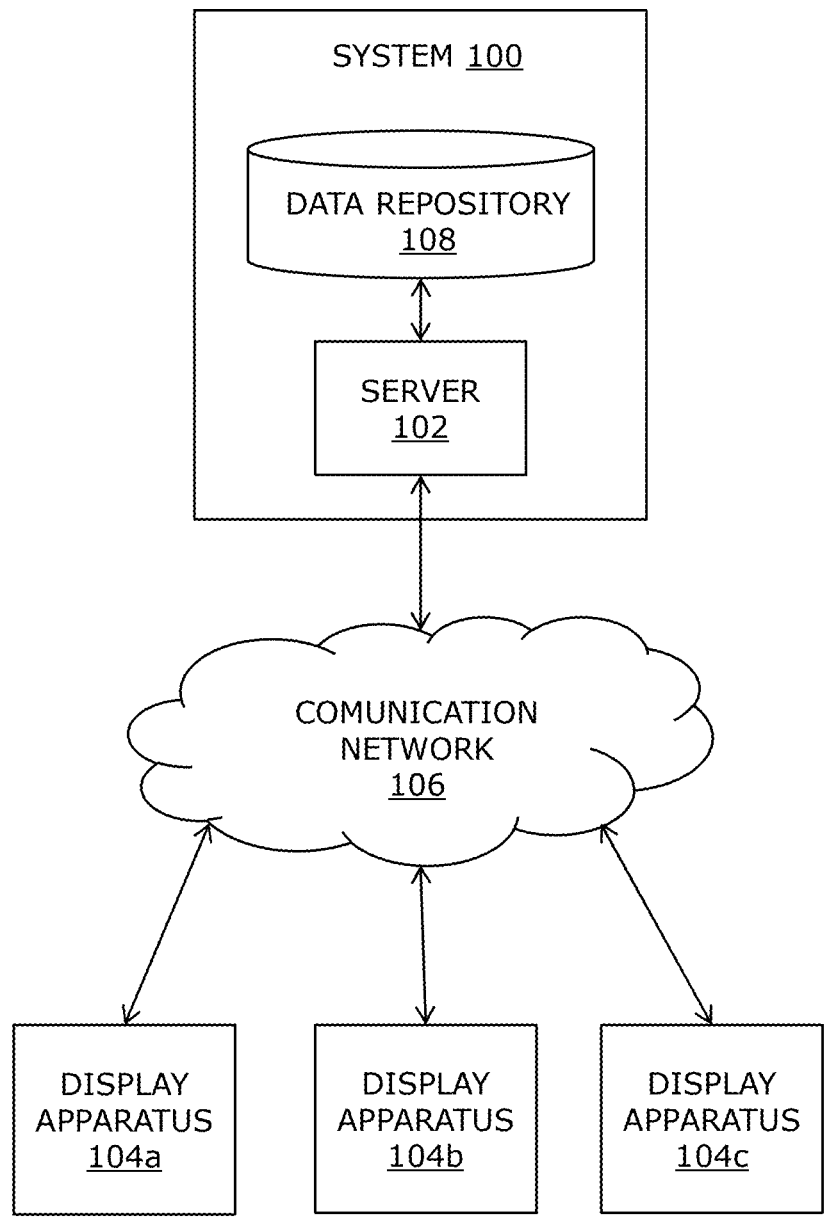
FIG. 1 illustrates a schematic diagram of a network environment in which a system and at least one display apparatus can be implemented, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method implemented by a display apparatus, the method comprising:
 dividing a display area of an output image into a plurality of regions;
 for a given region of the output image, determining a corresponding first region in a video-see-through (VST) image and a corresponding second region in at least one virtual-reality (VR) image;
 determining, from a depth map corresponding to the VST image, a minimum optical depth and a maximum optical depth in the first region of the VST image;
 determining, from a depth map corresponding to the at least one VR image, a minimum optical depth and a maximum optical depth in the second region of the at least one VR image;
 when the minimum optical depth in the first region of the VST image is greater than the maximum optical depth in the second region of the at least one VR image, fetching pixel data for pixels in the given region of the output image from the second region of the at least one VR image; and
 when the minimum optical depth in the second region of the at least one VR image is greater than the maximum optical depth in the first region of the VST image, fetching the pixel data for the pixels in the given region of the output image from the first region of the VST image.

In a second aspect, an embodiment of the present disclosure provides a display apparatus comprising a processor configured to:
 divide a display area of an output image into a plurality of regions;
 for a given region of the output image, determine a corresponding first region in a video-see-through (VST) image and a corresponding second region in at least one virtual-reality (VR) image;

determine, from a depth map corresponding to the VST image, a minimum optical depth and a maximum optical depth in the first region of the VST image;

determine, from a depth map corresponding to the at least one VR image, a minimum optical depth and a maximum optical depth in the second region of the at least one VR image;

when the minimum optical depth in the first region of the VST image is greater than the maximum optical depth in the second region of the at least one VR image, fetch pixel data for pixels in the given region of the output image from the second region of the at least one VR image; and when the minimum optical depth in the second region of the at least one VR image is greater than the maximum optical depth in the first region of the VST image, fetch the pixel data for the pixels in the given region of the output image from the first region of the VST image.

Pursuant to the present disclosure, when the minimum optical depth in the first region of the VST image is greater than the maximum optical depth in the second region of the at least one VR image (namely, in a case when VR content completely occludes any VST content within the given region of the output image), the pixel data for the pixels in the given region of the output image are fetched from the second region of the at least one VR image only. In such a case, no pixel data is required to be fetched for the first region of the VST image; depth texture lookups can be skipped entirely in the first region of the VST image and the second region of the at least one VR image, and no comparisons are required to be performed between depth data of the first region of the VST image and depth data of the second region of the at least one VR image. On the other hand, when the minimum optical depth in the second region of the at least one VR image is greater than the maximum optical depth in the first region of the VST image (namely, in a case when VST content completely occludes any VR content within the given region of the output image), the pixel data for the pixels in the given region of the output image are fetched from the first region of the VST image only. In such a case, no pixel data is required to be fetched for the second region of the at least one VR image; depth texture lookups can be skipped entirely in in the first region of the VST image and the second region of the at least one VR image, and no comparisons are required to be performed between the depth data of the first region of the VST image and the depth data of the second region of the at least one VR image.

This eliminates a vast majority of depth texture lookups and comparisons that would have been otherwise required to be performed on per-pixel basis conventionally during a composition process. This, in turn, reduces any wastage of processing resources in fetching depth data that was not required at the first place, thereby reducing computational burden, delays, and power consumption. These technical benefits arise due to a fact that in most extended-reality (XR) use cases, large continuous regions of the display area are fully covered by either VST content or VR content, and regions where the VST content and the VR content are intermixed (for example, where there is an edge between the VST content and the VR content) are relatively smaller as compared to the entirety of the display area. For purposes of the present disclosure, the term "extended reality" encompasses augmented reality and mixed reality.

Notably, the regions where the VST content and the VR content are intermixed refers to regions in which the minimum optical depth in the first region of the VST image is not greater than the maximum optical depth in the second region of the at least one VR image, and the minimum optical depth in the second region of the at least one VR image is not greater than the maximum optical depth in the first region of the VST image. Optionally, in this regard, the method further comprises: when the minimum optical depth in the first region of the VST image is not greater than the maximum optical depth in the second region of the at least one VR image, and the minimum optical depth in the second region of the at least one VR image is not greater than the maximum optical depth in the first region of the VST image, fetching, from the depth map corresponding to the VST image, a first optical depth for a given pixel in the given region of the output image;

fetching, from the depth map corresponding to the at least one VR image, a second optical depth for the given pixel;

when the first optical depth is greater than or equal to the second optical depth, fetching pixel data for the given pixel from the second region of the at least one VR image; and when the first optical depth is smaller than the second optical depth, fetching pixel data for the given pixel from the first region of the VST image.

Hereinabove, the term "given pixel" refers to any pixel from amongst a plurality of pixels in the given region of the output image. The aforementioned steps have been recited with respect to the given pixel, for the sake of clarity only. These steps can be performed in a similar manner for all the pixels in the given region.

There will now be provided details of the steps of the aforementioned method. Throughout the present disclosure, the term "given region" refers to any region from amongst the plurality of regions of the output image. The steps have been recited with respect to the given region, for the sake of clarity only. These steps can be performed in a similar manner for all the regions of the output image.

Division of Display Area into Regions

The display area could be specified as a display area of a light source (namely, a display or a projector) of the display apparatus, whereat the output image is to be displayed. As an example, it could be measured in terms of a number of pixels along a horizontal direction and a vertical direction (for example, such as an M×N pixel array).

In some implementations, the plurality of regions of the display area could be in a form of tiles. In other words, the display area could be divided into fixed-sized regions. As an example, the plurality of regions could be in a form of tiles of 16×8 pixels, 16×16 pixels, 32×16 pixels, 32×32 pixels, 64×64 pixels, or similar.

In other implementations, the display area could be divided into the plurality of regions iteratively. Optionally, in this regard, the display area is initially divided into regions of a first size (namely, a largest size) according to a first hierarchy level; for each region of the first size, a check is performed, where it is checked if one of the following criteria is true:

(i) the minimum optical depth in the corresponding first region of the VST image is greater than the maximum optical depth in the corresponding second region of the at least one VR image, or (ii) the minimum optical depth in the second region of the at least one VR image is greater than the maximum optical depth in the first region of the VST image.

If one of the aforementioned criteria is true, said region of the first size is not further divided. Otherwise, said region of the first size is further divided into smaller regions. In this regard, said region could be further divided into smaller regions of a second size according to a second hierarchy level (that is finer than the first hierarchy level).

Subsequently, for each region of the second size, the same check could be performed at the second hierarchy level, and so on. It will be appreciated that such iterative division of the display area can be stopped at a predefined hierarchy level, so as to prevent wastage of computing resources and unnecessary delays. The predefined hierarchy level can be selected based on the computing resources available for performing the composition process as well as a native resolution of the light source.

Moreover, optionally, the method further comprises receiving, from at least one server, information indicative of the minimum optical depth and the maximum optical depth in different regions of the at least one VR image. This not only makes the step of dividing (that is performed iteratively) faster, but also makes the overall method faster, as it allows to perform the aforementioned checks trivially. Notably, the comparisons are performed at the same hierarchy level.

This information could be provided using a multi-resolution mipmap hierarchy of the different regions of the at least one VR image. A coarsest level (namely, a root level) of this hierarchy could be for an entirety of the output image, and therefore, would include the minimum optical depth and the maximum optical depth for an entirety of the at least one VR image. Accordingly, the minimum optical depth and the maximum optical depth of the entirety of the at least one VR image could be compared with the minimum optical depth and the maximum optical depth of at least a portion of the VST image over which the at least one VR image may be superimposed. This would make the entire process faster, because there is no need to compare the minimum optical depth and the maximum optical depth for each tile separately.

Determining Corresponding First Region in VST Image and Corresponding Second Region in VR Image The terms "corresponding first region" and "corresponding second region" refer to respective regions in the VST image and the at least one VR image from which the pixel data of the given region of the output image may be fetched. In some implementations, the display area could be measured in terms of a total number of pixels along a horizontal direction and a total number of pixels along a vertical direction. In such implementations, if a resolution (namely, pixel density or pixels per degree) of the output image is same as a resolution of the VST image and/or a resolution of the at least one VR image, the corresponding first region in the VST image can be determined by mapping position coordinates of the given region in the output image with position coordinates of the corresponding first region in the VST image and/or with position coordinates of the corresponding second region in the at least one VR image. However, it will be appreciated that it is not necessary that the resolution of the output image is the same as the resolution of the VST image and the resolution of the at least one VR image.

In other implementations, the display area could be measured in terms of an angular width (namely, as a field of view in the horizontal direction and the vertical direction). In such implementations, the corresponding first region in the VST image can be determined by mapping a field of view of the output image with a field of view of the VST image. On the other hand, the corresponding second region in the at least one VR image can be determined by mapping a portion of the field of view of the output image (whereat the at least one VR image may be embedded) with a field of view of the at least one VR image. This can be performed trivially by employing well-known techniques in the art.

In some cases, the at least one VR image could include a single VR image. In other cases, the at least one VR image could include a plurality of VR images. It will be appreciated that there can be multiple VR images, even for a same region of the output image.

Moreover, it will be appreciated that the first region and the second region may be slightly larger than the given region in size, to account for any corrections (for example, such as distortion correction, reprojection, or similar) that may be required to be performed during the composition process.

Determining Minimum Optical Depth and Maximum Optical Depth

As the depth map corresponding to the VST image is available to the display apparatus, the minimum optical depth and the maximum optical depth in the first region of the VST image can be determined trivially by comparing optical depths of all the pixels in the first region. Moreover, the depth map corresponding to the at least one VR image is also available to the display apparatus from the at least one server; thus, the minimum optical depth and the maximum optical depth in the second region of the at least one VR image can also be determined trivially by comparing optical depths of all the pixels in the second region.

Moreover, as mentioned earlier, in some implementations, the aforesaid information (indicative of the minimum optical depth and the maximum optical depth in the different regions of the at least one VR image) could be available to the display apparatus. In such implementations, the minimum optical depth and the maximum optical depth can be accessed from said information for the second region of the at least one VR image. As this information could be provided using a multi-resolution mipmap hierarchy of the different regions of the at least one VR image, the minimum optical depth and the maximum optical depth can be accessed quickly from said information when the step of dividing is performed iteratively. This makes the step of determining also faster, thereby making the overall method faster.

Fetching Pixel Data

Pursuant to the present disclosure, the pixel data of the given region is fetched from the first region of the VST image or the second region of the at least one VR image, depending on which one of these regions occludes another of these regions. As the comparisons are performed using the minimum optical depths and the maximum optical depths, no depth comparisons are required to be made on a per-pixel basis for cases where one of the regions occludes another of these regions.

The pixel data comprises colour data and optionally, at least one of: alpha data, luminance data. When the pixel data comprises alpha data, some additional considerations may also be taken. Optionally, in this regard, the method further comprises:

when the minimum optical depth in the first region of the VST image is greater than the maximum optical depth in the second region of the at least one VR image, detecting whether a transparency of at least a part of the second region of the at least one VR image is more than a predefined threshold; and when it is detected that the transparency of at least a part of the second region of the at least one VR image is more than the predefined threshold, fetching pixel data for at least a subset of the pixels in the given region of the output image from the first region of the VST image, wherein said subset of the pixels in the given region of the output image correspond to said part of the second region of the at least one VR image whose transparency is more than the predefined threshold.

As an example, the transparency can be measured in terms of percentage. Higher percentage means higher transparency. In such a case, the predefined threshold could lie in a range of 20 to 50 percent. This may be particularly beneficial in a case where the VR content is somewhat transparent, and therefore, the pixel data of at least the subset of the pixels in the given region of the output image need to be fetched from the first region of the VST image. This takes into account a layering order during the composition process.

The present disclosure also relates to the display apparatus as described above. Various embodiments and variants disclosed above, with respect to the aforementioned method of the first aspect, apply mutatis mutandis to the display apparatus of the second aspect. The display apparatus further comprises at least one light source, wherein the processor is configured to display the output image via the at least one light source. The display apparatus could be implemented, for example, as a head-mounted display (HMD) device or a computing device that is communicably coupled to the HMD device. The term "head-mounted display" device refers to a display device that is employed to present an XR environment to a user when said HMD device, in operation, is worn by the user on his/her head. The HMD device can be implemented, for example, as an XR headset, a pair of XR glasses, and the like, that is operable to display a visual scene of the XR environment to the user.

Optionally, the processor is configured to: when the minimum optical depth in the first region of the VST image is not greater than the maximum optical depth in the second region of the at least one VR image, and the minimum optical depth in the second region of the at least one VR image is not greater than the maximum optical depth in the first region of the VST image,
  fetch, from the depth map corresponding to the VST image, a first optical depth for a given pixel in the given region of the output image;
  fetch, from the depth map corresponding to the at least one VR image, a second optical depth for the given pixel;
  when the first optical depth is greater than or equal to the second optical depth, fetch pixel data for the given pixel from the second region of the at least one VR image; and
  when the first optical depth is smaller than the second optical depth, fetch pixel data for the given pixel from the first region of the VST image.

Optionally, the plurality of regions of the display area are in a form of tiles. Alternatively, optionally, the display area is divided into the plurality of regions iteratively.

Optionally, the processor is configured to:
  when the minimum optical depth in the first region of the VST image is greater than the maximum optical depth in the second region of the at least one VR image, detect whether a transparency of at least a part of the second region of the at least one VR image is more than a predefined threshold; and
  when it is detected that the transparency of at least a part of the second region of the at least one VR image is more than the predefined threshold, fetch pixel data for at least a subset of the pixels in the given region of the output image from the first region of the VST image, wherein said subset of the pixels in the given region of the output image correspond to said part of the second region of the at least one VR image whose transparency is more than the predefined threshold.

Furthermore, in order to further reduce computational burden, delays and power consumption at a client side (namely, at the display apparatus), it is possible to perform at least some of the aforementioned steps at the server side. In this regard, there will now be provided some additional aspects.

In a third aspect, an embodiment of the present disclosure provides a method implemented by at least one server that is communicably coupled to at least one display apparatus, the method comprising:
  receiving, from the at least one display apparatus, depth data corresponding to a video-see-through (VST) image captured at the at least one display apparatus;
  dividing a display area into a plurality of regions;
  for a given region of the display area, determining a corresponding first region in the VST image and a corresponding second region in at least one virtual-reality (VR) image;
  determining, from the depth data corresponding to the VST image, a minimum optical depth and a maximum optical depth in the first region of the VST image;
  determining, from at least one depth map corresponding to the at least one VR image, a minimum optical depth and a maximum optical depth in the second region of the at least one VR image;
  when the minimum optical depth in the first region of the VST image is greater than the maximum optical depth in the second region of the at least one VR image, classifying the given region of the display area as a VR region that is to be rendered from the at least one VR image only;
  when the minimum optical depth in the second region of the at least one VR image is greater than the maximum optical depth in the first region of the VST image, classifying the given region of the display area as a VST region that is to be rendered from the VST image only;
  when the minimum optical depth in the first region of the VST image is not greater than the maximum optical depth in the second region of the at least one VR image, and the minimum optical depth in the second region of the at least one VR image is not greater than the maximum optical depth in the first region of the VST image, classifying the given region of the display area as a mixed region that is to be rendered from the at least one VR image and the VST image; and
  sending, to the at least one display apparatus, information indicative of respective classifications of the plurality of regions.

In a fourth aspect, an embodiment of the present disclosure provides a system comprising at least one server that is communicably coupled to at least one display apparatus, the at least one server being configured to:
  receive, from the at least one display apparatus, depth data corresponding to a video-see-through (VST) image captured at the at least one display apparatus;
  divide a display area into a plurality of regions;
  for a given region of the display area, determine a corresponding first region in the VST image and a corresponding second region in at least one virtual-reality (VR) image;

determine, from the depth data corresponding to the VST image, a minimum optical depth and a maximum optical depth in the first region of the VST image;

determine, from at least one depth map corresponding to the at least one VR image, a minimum optical depth and a maximum optical depth in the second region of the at least one VR image;

when the minimum optical depth in the first region of the VST image is greater than the maximum optical depth in the second region of the at least one VR image, classify the given region of the display area as a VR region that is to be rendered from the at least one VR image only;

when the minimum optical depth in the second region of the at least one VR image is greater than the maximum optical depth in the first region of the VST image, classify the given region of the display area as a VST region that is to be rendered from the VST image only;

when the minimum optical depth in the first region of the VST image is not greater than the maximum optical depth in the second region of the at least one VR image, and the minimum optical depth in the second region of the at least one VR image is not greater than the maximum optical depth in the first region of the VST image, classify the given region of the display area as a mixed region that is to be rendered from the at least one VR image and the VST image; and send, to the at least one display apparatus, information indicative of respective classifications of the plurality of regions.

Pursuant to the present disclosure, when the information indicative of the respective classifications of the plurality of regions (namely, into respective ones of: a VR region, a VST region, a mixed region) are provided to the at least one display apparatus, the technical benefits of eliminating a vast majority of depth texture lookups and comparisons are achieved in a more computationally-efficient and time-efficient manner. As the respective classifications of the plurality of regions are pre-determined at the server side, the at least one display apparatus can trivially utilise the information indicative of the respective classifications to:

(i) for region(s) that are classified as VR region(s), fetch the pixel data for those region(s) of the output image from corresponding second regions of the at least one VR image;

(ii) for region(s) that are classified as VST region(s), fetch the pixel data for those region(s) of the output image from corresponding first regions of the VST image;

(iii) for region(s) that are classified as mixed region(s), perform depth texture lookups and comparisons.

It will be appreciated that typically the depth data and the VST image are not available exactly at a same time (due to latency in collecting the depth data); as a result, there is some latency in determining occlusions at the display apparatus side. Therefore, when the entire classification process is performed at the server side in a cloud-based XR rendering system, there is only a slight increase in the latency in determining the occlusions. This latency can be made unnoticeable to a user viewing the output image, by employing prediction algorithms (well known in the art) as well as by taking into consideration safety thresholds when dividing the display area and determining corresponding first regions in the VST image and corresponding second regions in the at least one VR image.

The depth data corresponding to the VST image may be received in a form of a depth map corresponding to the VST image. It will be appreciated that the depth data can be collected by employing a depth camera of the at least one display apparatus. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. In some implementations, a single camera (that is implemented as a combination of a visible-light camera and a depth camera) can be employed to capture the VST image and collect the depth data.

Optionally, the system further comprises at least one data repository. The at least one server could be configured to store respective classifications of the plurality of regions at the at least one data repository. The at least one data repository could be implemented, for example, such as a memory of the at least one server, a memory of a computing device, a removable memory, a cloud-based database, or similar. It will be appreciated that the at least one server can be implemented as a cloud server, or a computing device that is communicable coupled to the at least one display apparatus.

Moreover, optionally, the method further comprises skipping encoding and transport of the second region of the at least one VR image to the at least one display apparatus, when the minimum optical depth in the second region of the at least one VR image is greater than the maximum optical depth in the first region of the VST image. This applies well for the depth data as well as the pixel data of the second region, wherein the pixel data comprises the colour data and optionally, alpha data, luminance data.

In other words, for the region(s) classified as VST region(s), corresponding second regions of the at least one VR image are not required to be processed at the at least one display apparatus; therefore, it would be beneficial to skip encoding and transport of such second regions of the at least one VR image altogether. As an example, this can be achieved by leveraging HEVC slicing in cases where the encoding is performed by employing high efficiency video coding (HEVC).

This allows to reduce any wastage of processing resources in unnecessarily encoding such second regions, and of network bandwidth in unnecessarily transporting such second regions to the at least one display apparatus. This, in turn, allows to use the processing resources and available bitrate more appropriately for corresponding second regions of the regions(s) classified as the VR regions and optionally the mixed regions.

Optionally, the plurality of regions of the display area are in a form of tiles. Alternatively, the display area is divided into the plurality of regions iteratively.

It will be appreciated that the steps of the aforementioned method of the third aspect can be performed in a similar manner as the steps of the method of the first aspect.

The present disclosure also relates to the system as described above. Various embodiments and variants disclosed above, with respect to the aforementioned method of the third aspect, apply mutatis mutandis to the system of the fourth aspect.

Optionally, the at least one server is configured to skip encoding and transport of the second region of the at least one VR image to the at least one display apparatus, when the minimum optical depth in the second region of the at least one VR image is greater than the maximum optical depth in the first region of the VST image.

DETAILED DESCRIPTION OF THE DRAWINGS

FIG. 1 illustrates a schematic diagram of a network environment in which a system 100 and at least one display apparatus can be implemented, in accordance with an embodiment of the present disclosure. The system 100 comprises at least one server (depicted as a server 102) that is communicably coupled to the at least one display apparatus (depicted as display apparatuses 104*a-c*), for example, via a communication network 106. The system 100 optionally comprises at least one data repository (depicted as a data repository 108) that is communicably coupled to the server 102.

It may be understood by a person skilled in the art that FIG. 1 illustrates a simplified block diagram of the network environment, for sake of clarity, which should not unduly limit the scope of the claims herein. It is to be understood that the specific implementation of the system 100 is provided as an example and is not to be construed as limiting it to specific numbers or types of servers, display apparatuses, communication networks and data repositories. The person skilled in the art will recognize many variations, alternatives, and modifications of embodiments of the present disclosure.

Figure 2:
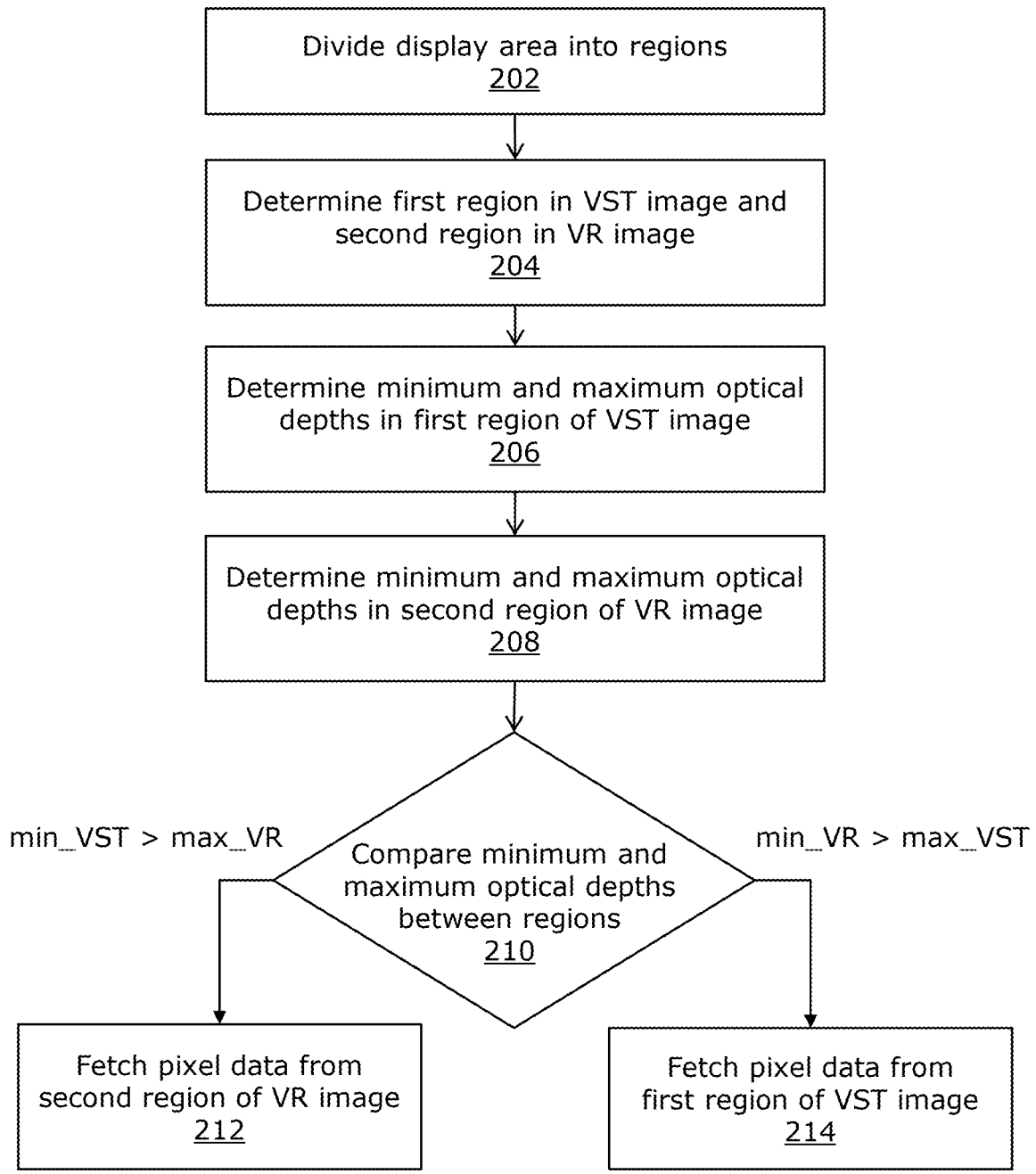
FIG. 2 illustrates steps of a method implemented by a display apparatus, in accordance with an embodiment of the present disclosure.

FIG. 2 illustrates steps of a method implemented by a display apparatus, in accordance with an embodiment of the present disclosure. At a step 202, a display area of an output image is divided into a plurality of regions. At a step 204, for a given region of the output image, a corresponding first region in a VST image and a corresponding second region in at least one VR image are determined. At a step 206, from a depth map corresponding to the VST image, a minimum optical depth and a maximum optical depth in the first region of the VST image are determined. At a step 208, from a depth map corresponding to the at least one VR image, a minimum optical depth and a maximum optical depth in the second region of the at least one VR image are determined. At a step 210, the minimum optical depth in the first region of the VST image is compared with the maximum optical depth in the second region of the at least one VR image, and/or the minimum optical depth in the second region of the at least one VR image is compared with the maximum optical depth in the first region of the VST image. If at step 210 it is determined that the minimum optical depth in the first region of the VST image is greater than the maximum optical depth in the second region of the at least one VR image, step 212 is performed; at step 212, pixel data for pixels in the given region of the output image from the second region of the at least one VR image is fetched. If at step 210 it is determined that the minimum optical depth in the second region of the at least one VR image is greater than the maximum optical depth in the first region of the VST image, step 214 is performed; at step 214, the pixel data for the pixels in the given region of the output image from the first region of the VST image is fetched.

The aforementioned steps are only illustrative and other alternatives can also be provided where one or more steps are added, one or more steps are removed, or one or more steps are provided in a different sequence without departing from the scope of the claims. For example, the steps 206 and 208 can be performed simultaneously.

Figure 3:
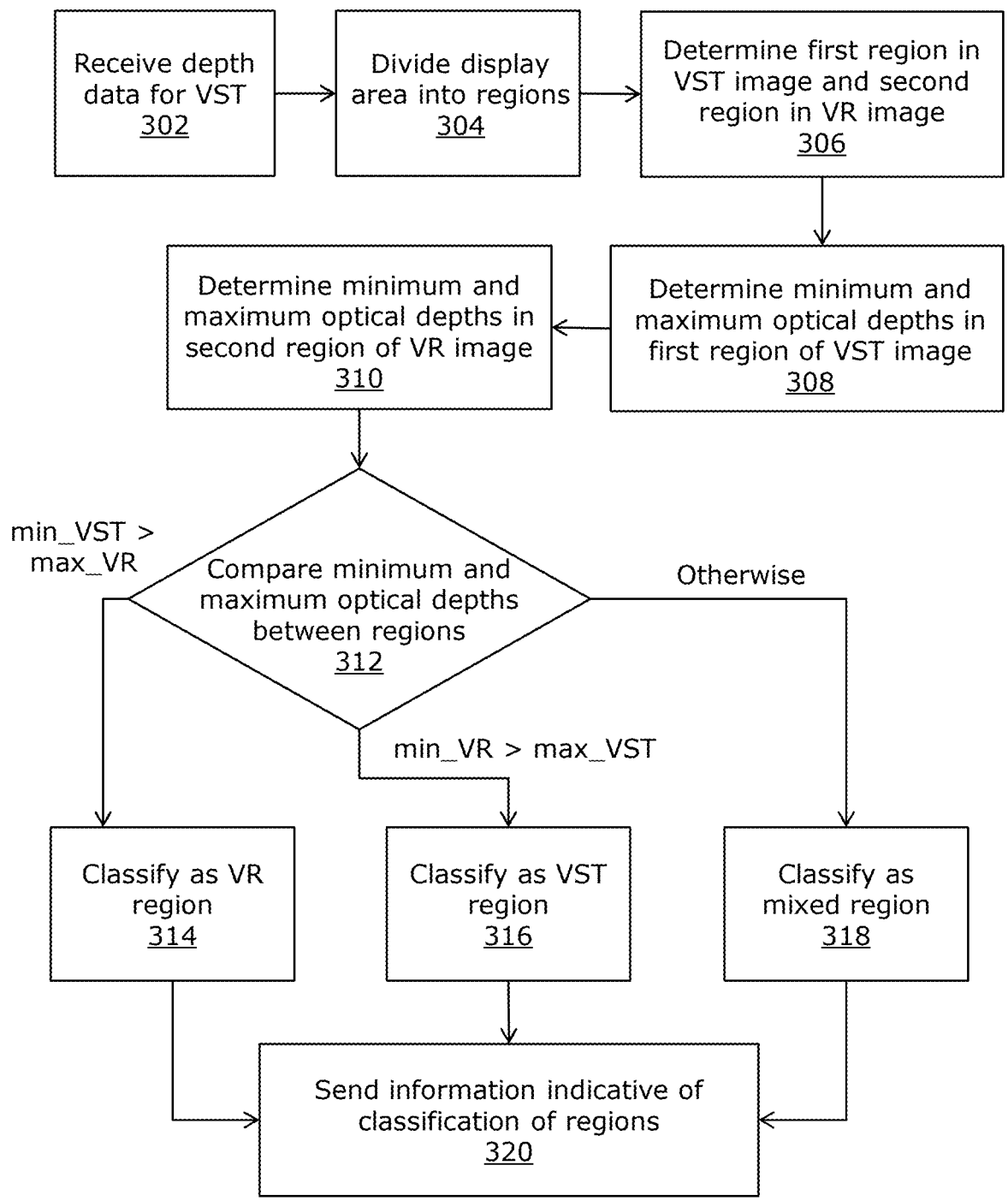
FIG. 3 illustrates steps of a method implemented by a system comprising at least one server communicably coupled to at least one display apparatus, in accordance with an embodiment of the present disclosure.

FIG. 3 illustrates steps of a method implemented by a system comprising at least one server communicably coupled to at least one display apparatus, in accordance with an embodiment of the present disclosure. At step 302, depth data corresponding to a video-see-through (VST) image captured at the at least one display apparatus is received. At step 304, a display area is divided into a plurality of regions. At step 306, for a given region of the display area, a corresponding first region in the VST image and a corresponding second region in at least one virtual-reality (VR) image are determined. At step 308, a minimum optical depth and a maximum optical depth in the first region of the VST image are determined from the depth data corresponding to the VST image. At step 310, a minimum optical depth and a maximum optical depth in the second region of the at least one VR image are determined from at least one depth map corresponding to the at least one VR image. At step 312, the minimum optical depth in the first region of the VST image is compared with the maximum optical depth in the second region of the at least one VR image, and the minimum optical depth in the second region of the at least one VR image is compared with the maximum optical depth in the first region of the VST image. If at step 312 it is determined that the minimum optical depth in the first region of the VST image is greater than the maximum optical depth in the second region of the at least one VR image, step 314 is performed; at step 314, the given region of the display area is classified as a VR region that is to be rendered from the at least one VR image only. If at step 312 it is determined that the minimum optical depth in the second region of the at least one VR image is greater than the maximum optical depth in the first region of the VST image, step 316 is performed; at step 316, the given region of the display area is classified as a VST region that is to be rendered from the VST image only. Otherwise, if at step 312 it is determined that the minimum optical depth in the first region of the VST image is not greater than the maximum optical depth in the second region of the at least one VR image, and the minimum optical depth in the second region of the at least one VR image is not greater than the maximum optical depth in the first region of the VST image, step 318 is performed; at step 318, the given region of the display area is classified as a mixed region that is to be rendered from the at least one VR image and the VST image. Finally, at step 320, information indicative of respective classifications of the plurality of regions is sent to the at least one display apparatus.

The aforementioned steps are only illustrative and other alternatives can also be provided where one or more steps are added, one or more steps are removed, or one or more steps are provided in a different sequence without departing from the scope of the claims. For example, the steps 308 and 310 can be performed simultaneously.

What is claimed is:

1. A method implemented by a display apparatus, the method comprising:
   dividing a display area of an output image into a plurality of regions;
   for a given region of the output image, determining a corresponding first region in a video-see-through (VST) image and a corresponding second region in at least one virtual-reality (VR) image;
   determining, from a depth map corresponding to the VST image, a minimum optical depth and a maximum optical depth in the first region of the VST image;
   determining, from a depth map corresponding to the at least one VR image, a minimum optical depth and a maximum optical depth in the second region of the at least one VR image;
   when the minimum optical depth in the first region of the VST image is greater than the maximum optical depth in the second region of the at least one VR image, fetching pixel data for pixels in the given region of the output image from the second region of the at least one VR image; and
   when the minimum optical depth in the second region of the at least one VR image is greater than the maximum optical depth in the first region of the VST image, fetching the pixel data for the pixels in the given region of the output image from the first region of the VST image.

2. The method of claim 1, further comprising when the minimum optical depth in the first region of the VST image is not greater than the maximum optical depth in the second region of the at least one VR image, and the minimum optical depth in the second region of the at least one VR image is not greater than the maximum optical depth in the first region of the VST image,
- fetching, from the depth map corresponding to the VST image, a first optical depth for a given pixel in the given region of the output image;
- fetching, from the depth map corresponding to the at least one VR image, a second optical depth for the given pixel;
- when the first optical depth is greater than or equal to the second optical depth, fetching pixel data for the given pixel from the second region of the at least one VR image; and
- when the first optical depth is smaller than the second optical depth, fetching pixel data for the given pixel from the first region of the VST image.

3. The method of claim 1, further comprising:
- when the minimum optical depth in the first region of the VST image is greater than the maximum optical depth in the second region of the at least one VR image, detecting whether a transparency of at least a part of the second region of the at least one VR image is more than a predefined threshold; and
- when it is detected that the transparency of at least a part of the second region of the at least one VR image is more than the predefined threshold, fetching pixel data for at least a subset of the pixels in the given region of the output image from the first region of the VST image, wherein said subset of the pixels in the given region of the output image correspond to said part of the second region of the at least one VR image whose transparency is more than the predefined threshold.

4. The method of claim 1, wherein the plurality of regions of the display area are in a form of tiles.

5. The method of claim 1, wherein the display area is divided into the plurality of regions iteratively.

6. A method implemented by at least one server that is communicably coupled to at least one display apparatus, the method comprising:
- receiving, from the at least one display apparatus, depth data corresponding to a video-see-through (VST) image captured at the at least one display apparatus;
- dividing a display area into a plurality of regions;
- for a given region of the display area, determining a corresponding first region in the VST image and a corresponding second region in at least one virtual-reality (VR) image;
- determining, from the depth data corresponding to the VST image, a minimum optical depth and a maximum optical depth in the first region of the VST image;
- determining, from at least one depth map corresponding to the at least one VR image, a minimum optical depth and a maximum optical depth in the second region of the at least one VR image;
- when the minimum optical depth in the first region of the VST image is greater than the maximum optical depth in the second region of the at least one VR image, classifying the given region of the display area as a VR region that is to be rendered from the at least one VR image only;
- when the minimum optical depth in the second region of the at least one VR image is greater than the maximum optical depth in the first region of the VST image, classifying the given region of the display area as a VST region that is to be rendered from the VST image only;
- when the minimum optical depth in the first region of the VST image is not greater than the maximum optical depth in the second region of the at least one VR image, and the minimum optical depth in the second region of the at least one VR image is not greater than the maximum optical depth in the first region of the VST image, classifying the given region of the display area as a mixed region that is to be rendered from the at least one VR image and the VST image; and
- sending, to the at least one display apparatus, information indicative of respective classifications of the plurality of regions.

7. The method of claim 6, further comprising skipping encoding and transport of the second region of the at least one VR image to the at least one display apparatus, when the minimum optical depth in the second region of the at least one VR image is greater than the maximum optical depth in the first region of the VST image.

8. A display apparatus comprising a processor configured to:
- divide a display area of an output image into a plurality of regions;
- for a given region of the output image, determine a corresponding first region in a video-see-through (VST) image and a corresponding second region in at least one virtual-reality (VR) image;
- determine, from a depth map corresponding to the VST image, a minimum optical depth and a maximum optical depth in the first region of the VST image;
- determine, from a depth map corresponding to the at least one VR image, a minimum optical depth and a maximum optical depth in the second region of the at least one VR image;
- when the minimum optical depth in the first region of the VST image is greater than the maximum optical depth in the second region of the at least one VR image, fetch pixel data for pixels in the given region of the output image from the second region of the at least one VR image; and
- when the minimum optical depth in the second region of the at least one VR image is greater than the maximum optical depth in the first region of the VST image, fetch the pixel data for the pixels in the given region of the output image from the first region of the VST image.

9. The display apparatus of claim 8, wherein the processor is configured to: when the minimum optical depth in the first region of the VST image is not greater than the maximum optical depth in the second region of the at least one VR image, and the minimum optical depth in the second region of the at least one VR image is not greater than the maximum optical depth in the first region of the VST image,
- fetch, from the depth map corresponding to the VST image, a first optical depth for a given pixel in the given region of the output image;
- fetch, from the depth map corresponding to the at least one VR image, a second optical depth for the given pixel;
- when the first optical depth is greater than or equal to the second optical depth, fetch pixel data for the given pixel from the second region of the at least one VR image; and when the first optical depth is smaller than the second optical depth, fetch pixel data for the given pixel from the first region of the VST image.

10. The display apparatus of claim 8, wherein the processor is configured to:
when the minimum optical depth in the first region of the VST image is greater than the maximum optical depth in the second region of the at least one VR image, detect whether a transparency of at least a part of the second region of the at least one VR image is more than a predefined threshold; and
when it is detected that the transparency of at least a part of the second region of the at least one VR image is more than the predefined threshold, fetch pixel data for at least a subset of the pixels in the given region of the output image from the first region of the VST image, wherein said subset of the pixels in the given region of the output image correspond to said part of the second region of the at least one VR image whose transparency is more than the predefined threshold.

11. The display apparatus of claim 8, wherein the plurality of regions of the display area are in a form of tiles.

12. The display apparatus of claim 8, wherein the display area is divided into the plurality of regions iteratively.

13. A system comprising at least one server that is communicably coupled to at least one display apparatus, the at least one server being configured to:
receive, from the at least one display apparatus, depth data corresponding to a video-see-through (VST) image captured at the at least one display apparatus;
divide a display area into a plurality of regions;
for a given region of the display area, determine a corresponding first region in the VST image and a corresponding second region in at least one virtual-reality (VR) image;
determine, from the depth data corresponding to the VST image, a minimum optical depth and a maximum optical depth in the first region of the VST image;
determine, from at least one depth map corresponding to the at least one VR image, a minimum optical depth and a maximum optical depth in the second region of the at least one VR image;
when the minimum optical depth in the first region of the VST image is greater than the maximum optical depth in the second region of the at least one VR image, classify the given region of the display area as a VR region that is to be rendered from the at least one VR image only;
when the minimum optical depth in the second region of the at least one VR image is greater than the maximum optical depth in the first region of the VST image, classify the given region of the display area as a VST region that is to be rendered from the VST image only;
when the minimum optical depth in the first region of the VST image is not greater than the maximum optical depth in the second region of the at least one VR image, and the minimum optical depth in the second region of the at least one VR image is not greater than the maximum optical depth in the first region of the VST image, classify the given region of the display area as a mixed region that is to be rendered from the at least one VR image and the VST image; and
send, to the at least one display apparatus, information indicative of respective classifications of the plurality of regions.

14. The system of claim 13, wherein the at least one server is configured to skip encoding and transport of the second region of the at least one VR image to the at least one display apparatus, when the minimum optical depth in the second region of the at least one VR image is greater than the maximum optical depth in the first region of the VST image.

15. The system of claim 13, wherein the display area is divided into the plurality of regions iteratively.

\* \* \* \* \*